United States Patent [19]

Horsley

[11] 3,813,116
[45] May 28, 1974

[54] COUPLING FOR PLAIN END PIPES
[75] Inventor: William J. Horsley, La Canada, Calif.
[73] Assignee: Interspace Corporation, Parsippany, N.J.
[22] Filed: Oct. 17, 1972
[21] Appl. No.: 298,343

[52] U.S. Cl................................ 285/236, 285/423
[51] Int. Cl............................................ F16l 21/00
[58] Field of Search....... 285/236, 373, 423; 24/274

[56] References Cited
UNITED STATES PATENTS
3,334,928   8/1967   Schmunk........................ 285/236 X
3,424,482   1/1969   Ligon............................. 285/236 X Primary Examiner—Dave W. Arola
Attorney, Agent, or Firm—George F. Des Marais

[57] ABSTRACT

A coupling having a resiliently yieldable sealing sleeve adapted to be pressed into tight engagement with the end portions of aligned pipe sections by separate straps and tightening devices, and a band interposed between the sealing sleeve and the straps for alleviating frictional restraint on the sliding movements of the straps as they are being tightened, the band having channels in its exterior surface for receiving and seating the straps.

3 Claims, 4 Drawing Figures

PATENTED MAY 28 1974 3,813,116

COUPLING FOR PLAIN END PIPES

The present invention relates to couplings for coupling the adjacent end portions of aligned pipe sections.

Aligned pipe sections have been commonly connected by a coupling including a belt or sleeve of rubber or of similar resiliently yieldable material which overlaps the aligned pipe ends and is pressed tightly around the pipe ends by metallic straps to seal and secure the connected pipe ends. A metallic strap is generally tightened by a bolt and nut or by screw devices acting, when turned, to draw the ends of a strap towards one another and thus press the underlying sealing sleeve forcibly against the outer circumference of a pipe end. As the tensioning force applied to a strap is increased the strap becomes more resistant to adjustment due to increasingly greater pressure on the sleeve and the relatively high coefficient of friction between metal and rubber. As a consequence of this there is variable resistance to relative movement of a strap and a rubber sleeve circumferentially of the sleeve, and the compression of the sleeve around a pipe is not uniform.

Among the objects of the present invention is to overcome the inequality of the sealing effects of a sleeve coupling clamped over pipe ends, and to provide in a coupling of the general type referred to a balanced seizure with the connected pipe ends.

According to the invention the metallic tightening straps are mounted in contact with a band which encircles and overlies a sealing sleeve. The band is constituted of a material over which the straps will readily slide to adjust themselves as they are tensioned to compress a sealing sleeve. The band has channels for locating the straps in their proper positions lengthwise of the sealing sleeve.

Economy is effected by utilizing a thermoplastic material which is extruded as a strip of desired cross-sectional configuration and dimensions, smoothness of surfaces, and proper width for accommodation with a sealing sleeve of given dimensions.

The sealing sleeve is made of an elastomeric material. A molded sleeve is preferable though not essential.

The above, and other objects, features and advantages of the invention will be apparent from the following detailed description of an illustrative embodiment thereof, which is to be read in conjunction with the accompanying drawing forming a part of this disclosure, and wherein.

A pipe coupling embodying the present invention includes a sealing sleeve 10, a flexible reinforcing band 11, two steel straps 12, 13, and fastening devices 14, 15, for the straps.

Figure 3:
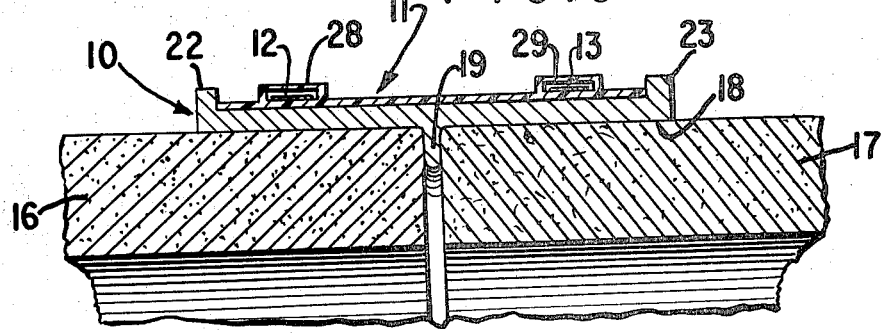
FIG. 3 is a longitudinal sectional view of a coupling and end portions of plain end pipe sections.
Figure 4:
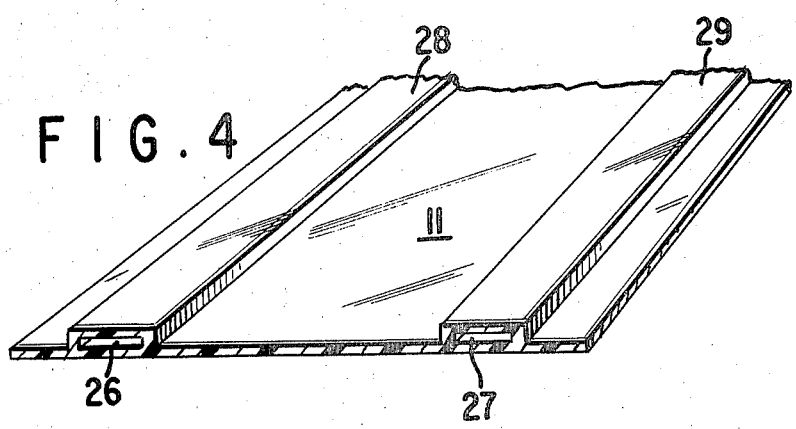
FIG. 4 is a perspective view of an extruded reinforcing band.

The sealing sleeve consists of a ring or collar of a resiliently yieldable material such as rubber, synthetic rubber, or other form of elastomeric material suitable for effectively sealing a joint between the ends of aligned pipe sections 16 and 17, as generally shown in FIG. 3.

The interior cylindrical surface 18 of the sealing sleeve 10 has an inner diameter slightly greater than that of the outer surfaces of the pipes to be coupled together, and a central inwardly directed flange 19 or stop ring for engaging and cushioning the end faces of coupled pipes. At the interior of the sealing sleeve there are two sets of beads or ribs 20, 21. While the beads are for providing additional gripping force of the sleeve onto the respective pipes, they are not essential to the invention.

The ends of the sleeve 10 have outwardly extending rails or flanges 22, 23, which serve to guide the band 11 into place during assembly of the coupling and to locate the band centrally of the length of the sleeve.

It is of advantage that the sealing sleeve 10 be molded in the form of a collar or ring so that the material thereof be homogeneous throughout the circumference of the sleeve and thus avoid the possiblity of contributing to an unequal distribution of pressure around pipes when the straps 12, 13 are tightened, as can occur from a sealing sleeve formed by a strip of rubber with its end overlapped. A molded sleeve is preferred especially for use in coupling ceramic pipe sections or vitrified clay pipes.

The reinforcing band 11 is semi-stiff, though flexible. It encircles the sealing sleeve 10 and is sufficiently long to provide overlapping end portions 24, 25, which lay to the pipe side of the fastening devices 14, 15, as may be seen in FIG. 2.

In its preferred form the reinforcing band is made from an extruded strip of a thermoplastic material having substantially parallel opposite surfaces with channels 26, 27, interiorly of hollow ridges 28, 29, formed integrally with the band. Whereas the channels may simply be open dished tracks extending longitudinally along the outer surface of a strip it is beneficial to provide them as enclosed passageways sufficiently ample for metallic straps to be easily inserted lengthwise thereof.

A criterion for a suitable reinforcing band is that the coefficient of friction between a metallic strap and the material of the band be relatively low so that a strap will be subject to only a minimum of frictional restraint due to its contact with the material of the band as the strap is tensioned to clamp the sealing sleeve onto a pipe. The deleterious effect of differential radial pressure about the circumference of the sleeve is thus considerably reduced. A polyethylene band has proven efficacious for the purpose intended. Polyolofins, vinyls and Nylon are examples of thermoplastic materials capable of extrusion in strips to provide bands with slippery surfaces.

In a coupling in which a steel strap is tightened in contact with and around a band or collar of rubber or of like material (between which the coefficient of friction is much higher), the greater friction causes very appreciable variance in the stress in the strap around the coupling as a fastening device is tightened. The sealing sleeve is therefore less forcibly subjected to pressure 180° away from a fastening device than adjacent to the fastening device. The undesired non-uniform sealing effect around a pipe in such a case increases as the diameter of the pipe and coupling is increased.

Figure 1:
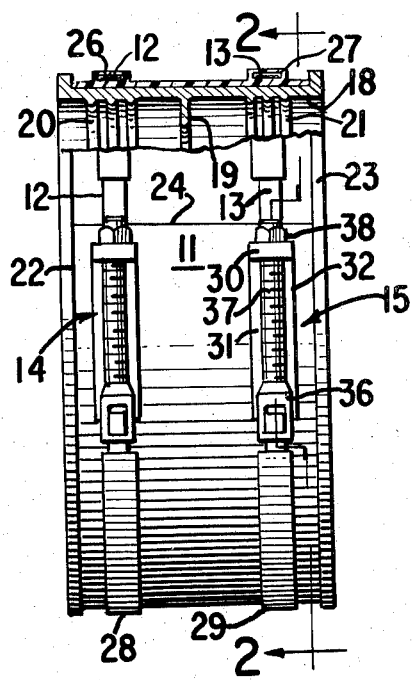
FIG. 1 is an outside view of a coupling with a portion cut away to show a longitudinal section thereof.
Figure 2:
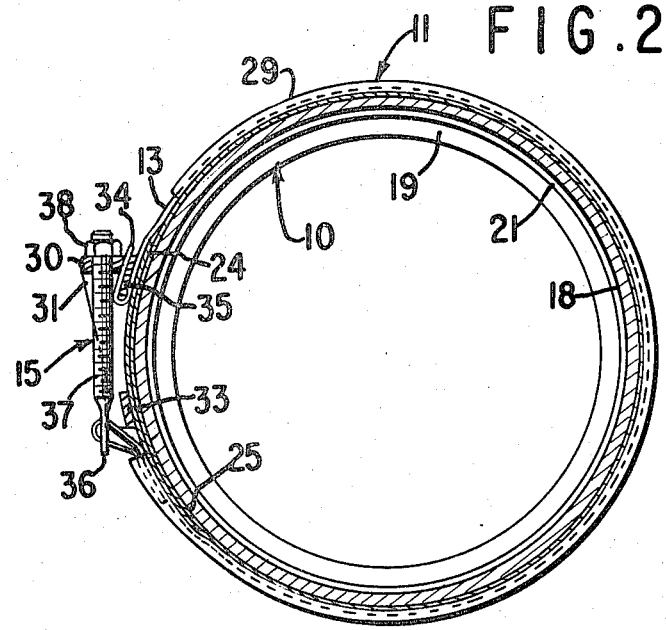
FIG. 2 illustrates a diametrical sectional view on line 2—2 of FIG. 1.

After a band of suitable material has been extruded it is cut to the length necessary to enwrap a sealing sleeve of a given size. The tops of the ridges 28, 29 are then cut away short distances from the ends of the band to enable the ends of the straps 12 and 13, respectively, to protrude for attachment to their associated fastening devices, 14, 15, as shown in FIGS. 1 and 2.

A suitable type of fastening device has been illustrated in the drawing, but it is apparent that other types may be used. The two fastening devices 14, 15 are similar and it will suffice to describe but one of these.

The fastening device 15 includes a head having a cross-member 30 connected to a pair of legs 31, 32 extending rearwardly therefrom and connected to a tail member 33 extending between the legs. The cross-member 30 of the head is slotted to receive one end 34 of the strap 13 which is looped over a ledge portion 35 of the cross-member, as best seen in FIG. 2.

The other end of the strap is looped over a bar formed between two slots in a flattened end 36 of a steel bolt 37. The strap is tensioned by tightening a nut 38 to bear on the cross-member 30 of the head and draw the looped ends of the strap towards one another and to apply tightening force to the strap.

It will be evident to those skilled in the art that various alterations and substitutions may be made without departing from the substance of the invention, which is intended to be defined in the following claims.

What is claimed is:

1. A coupling for coupling two pipe sections in end-to-end alignment, comprising a resilient sealing sleeve adapted to surround and engage the adjacent end portions of aligned pipe sections, a flexible reinforcing band wrapped around the sealing sleeve overlaying upon the outer surface of said sleeve, the ends of said band overlapping and slidable over one another, said band comprising a strip of non-metallic material having low frictional surfaces, said band having a pair of channels formed integral therewith, said channels extending circumferentially of said band and axially spaced from one another so as to respectively locate the channels to the outside of the respective adjacent end-portions of aligned pipe sections, said channels open in the region of the overlapping ends of said band for enabling access to the ends of straps disposed in said channels, a strap contained in each of said channels, each strap having its opposite ends accessible from the outside of said band for attachment to tension-applying means, and adjustable means attached to the opposite ends of each of said straps for applying tensional forces to said straps to contract the effective circumferential extent of each of said straps, whereby restraint of readjustment of said straps in relation to said sealing sleeve is alleviated during tensioning of the straps.

2. A coupline according to claim 1, wherein each of said strap-containing channels is constituted as a tubular passageway within a sheath which is open only at its ends for the passage of a strap.

3. A coupling according to claim 1, wherein said flexible reinforcing band is a strip of an extruded thermoplastic material.

* * * * *

UNITED STATES PATENT OFFICE
CERTIFICATE OF CORRECTION

Patent No. 3,813,116      Dated May 28, 1974

Inventor(s) William J. Horsley

It is certified that error appears in the above-identified patent and that said Letters Patent are hereby corrected as shown below:

In the heading, the name of the Assignee should read -- Interpace Corporation -- .

Signed and sealed this 29th day of October 1974.

(SEAL)
Attest:

McCOY M. GIBSON JR.
Attesting Officer

C. MARSHALL DANN
Commissioner of Patents